(12) United States Patent
Sunagawa et al.

(10) Patent No.: US 6,635,687 B2
(45) Date of Patent: Oct. 21, 2003

(54) EXPANDABLE VINYL CHLORIDE RESIN COMPOSITION

(75) Inventors: Takenobu Sunagawa, Toyonaka (JP); Mitsutaka Sato, Kobe (JP); Mamoru Kadokura, Himeji (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/069,956

(22) PCT Filed: Aug. 2, 2001

(86) PCT No.: PCT/JP01/06650
§ 371 (c)(1),
(2), (4) Date: Mar. 7, 2002

(87) PCT Pub. No.: WO02/12378
PCT Pub. Date: Feb. 14, 2002

(65) Prior Publication Data
US 2003/0027881 A1 Feb. 6, 2003

(30) Foreign Application Priority Data
Aug. 8, 2000 (JP) .......................................... 2000-239631

(51) Int. Cl.⁷ ................................ C08J 9/08; C08J 9/14
(52) U.S. Cl. ........................... 521/134; 521/91; 521/92; 521/93; 521/94; 521/145
(58) Field of Search ............................... 521/91, 92, 93, 521/94, 134, 145

(56) References Cited

U.S. PATENT DOCUMENTS

| | | |
|---|---|---|
| 3,879,313 A | 4/1975 | Huntzinger et al. |
| 4,025,465 A | 5/1977 | Dorrn et al. |
| 4,402,893 A | 9/1983 | Kitamura et al. |
| 4,427,795 A | 1/1984 | Dorrestijn et al. |
| 4,722,944 A | 2/1988 | Mori et al. |
| 4,797,426 A | 1/1989 | Waki et al. |
| 4,800,214 A | 1/1989 | Waki et al. |
| 5,532,055 A | 7/1996 | Igarashi et al. |
| 5,712,319 A | 1/1998 | Suzuki et al. |

FOREIGN PATENT DOCUMENTS

| | | | |
|---|---|---|---|
| JP | 50-126071 | | 10/1975 |
| JP | 55-139435 | | 10/1980 |
| JP | 55-149328 | | 11/1980 |
| JP | 60-8330 | * | 1/1985 |
| JP | 1-274702 | * | 11/1989 |
| JP | 4-239046 | * | 8/1992 |
| JP | 6-9813 | * | 1/1994 |
| JP | 9-151269 | * | 6/1997 |
| JP | 9-216965 | * | 8/1997 |
| JP | 9-239707 | | 9/1997 |
| JP | 10-36606 | * | 2/1998 |
| JP | 10-101832 | * | 4/1998 |
| JP | 10-182911 | | 7/1998 |
| JP | 11-92608 | * | 4/1999 |
| JP | 2000-17095 | * | 1/2000 |
| JP | 2001-89591 | * | 4/2001 |
| JP | 2001-89592 | * | 4/2001 |
| WO | WO97/33936 | * | 9/1997 |

* cited by examiner

*Primary Examiner*—Morton Foelak
(74) *Attorney, Agent, or Firm*—Armstrong, Westerman & Hattori, LLP

(57) ABSTRACT

An expandable vinyl chloride resin composition which can provide foamed articles having a greatly enhanced expansion ratio without remarkably lowering the surface property and strength by the use of thermally decomposable blowing agents without the use of organic solvent blowing agents, and which comprises 100 parts by weight of a vinyl chloride resin, 0.5 to 30 parts by weight of, as a processing aid, a two stage (meth)acrylic ester polymer having a specific viscosity of at least 0.5 (0.1 % chloroform solution, 30° C.) prepared by polymerizing a monomer component containing as a main component a monomer selected from acrylic esters and methacrylic esters excepting methyl methacrylate in the presence of a latex of a methyl methacrylate polymer having a specific viscosity of at least 0.7, 0.3 to 25 parts by weight of a thermally decomposable inorganic blowing agent, 0.01 to 15 parts by weight of a thermally decomposable organic blowing agent and 0 to 20 parts by weight of a filler.

4 Claims, No Drawings

EXPANDABLE VINYL CHLORIDE RESIN COMPOSITION

TECHNICAL FIELD

The present invention relates to an expandable vinyl chloride resin composition, and more particularly to an expandable vinyl chloride resin composition which is excellent in processability and provides cellular molded articles having a high expansion ratio and having excellent strength and surface property.

BACKGROUND ART

Polyvinyl chloride resins provide molded articles excellent in physical properties such as impact resistance and heat resistance and in chemical properties such as solvent resistance, acid resistance and alkali resistance and, therefore, have been widely used in the field of building materials and other various fields. In recent years, foaming method attracts attention as a means for lightening of vinyl chloride resins and cost reduction of molded articles. Cellular molded articles of vinyl chloride resins having a high expansion ratio have been demanded strongly from the market.

In foaming of vinyl chloride resins, generally known is a method using a blowing agent in combination with a processing aid comprising methyl methacrylate as a main component.

It is known that it is possible to achieve foaming in a high expansion ratio when an easily volatile organic solvent blowing agent such as an aliphatic hydrocarbon or a halogenated aliphatic hydrocarbon is used as the blowing agent mentioned above.

For example, Japanese Patent Publications Kokoku No. 60-10540 and Kokoku No.58-40986 disclose that foamed articles having an expansion ratio of several tens of times are obtained by impregnating a vinyl chloride resin with an organic solvent having a boiling point of not more than 90° C. such as butane or dichlorofluoromethane as a blowing agent or by directly introducing the organic solvent to an extruder during extrusion processing.

However, the use of an organic solvent blowing agent is disadvantageous in cost as compared with a thermally decomposable blowing agent, since equipments for the impregnation and for explosion proof are required in carrying out the molding.

On the other hand, in case of using a thermally decomposable blowing agent such as a thermally decomposable organic blowing agent or a thermally decomposable inorganic blowing agent, it is difficult under existing circumstances to raise the expansion ratio to more than about 3–4 times so long as it is desired to produce foamed articles having a smooth surface and to keep the cells thereof uniform and fine. If the expansion ratio is raised to more than 4 times, especially to more than 5 times, there arises a problem that the strength and surface property of foamed articles are deteriorated.

For example, Japanese Patent Publication Kokoku No. 63-9540 discloses an expandable vinyl chloride resin composition obtained by adding a methacrylate resin (polymethyl methacrylate having a degree of polymerization of 2,000 to 30,000, that is, a weight average molecular weight of 200,000 to 3,000,000) with a thermally decomposable organic blowing agent such as azodicarbonamide and a thermally decomposable inorganic blowing agent such as sodium bicarbonate and further with a filler such as calcium carbonate to a vinyl chloride resin having an average degree of polymerization of 500 to 800. It is disclosed that this expandable vinyl chloride resin composition is molded to give foamed articles having uniform and fine cells and having excellent surface property and surface hardness, but the expansion ratio is at most about 3–4 times.

Also, Japanese Patent Publication Kokai No. 6-9813 discloses an expandable vinyl chloride resin composition obtained by adding a methacrylate resin and a bicarbonate having a particle size of not more than 10 μm as a thermally decomposable blowing agent to a vinyl chloride resin. It is disclosed that this expandable vinyl chloride resin composition is molded to give foamed articles having uniform and fine cells and having good heat stability and weatherability, but no detail of the average molecular weight of methacrylate resin and the expansion ratio is disclosed therein.

Further, Japanese Patent Publication Kokai No. 9-151269 discloses an expandable vinyl chloride resin composition obtained by adding a polymethyl methacrylate resin having a weight average molecular weight of 4,500,000 to 7,000,000 and a thermally decomposable blowing agent to a vinyl chloride resin. It is disclosed that this expandable vinyl chloride resin composition is molded to give injection-molded foams having uniform cells without occurrence of decomposition of the resins. However, in the working examples thereof, as the polymethyl methacrylate resin is used only a resin "P-531" made by Mitsubishi Rayon Co., Ltd. having a weight average molecular weight of 4,700,000, and no evaluation is made with respect to monomer composition and expandability. Also, the obtained expansion ratios are at most about 2–3 times.

Also, Japanese Patent Publication Kokai No. 9-208732 discloses an expandable vinyl chloride resin composition obtained by incorporating a methacrylic ester resin, a chlorinated polyethylene resin, talc and a blowing agent into a vinyl chloride resin. It is disclosed that this expandable vinyl chloride resin composition is molded with good molding processability to give foamed articles having a small linear expansion coefficient and uniform cells. However, the obtained expansion ratios are at most about 2–3 times.

Thus, it is an object of the present invention to provide an expandable vinyl chloride resin composition, according to which the expansion ratio can be markedly increased by the use of a thermally decomposable blowing agent without using any organic solvent-based blowing agent in the foaming, and deterioration of strength and surface property of foamed articles caused by the increase in expansion ratio can be suppressed.

DISCLOSURE OF INVENTION

The present inventors have found that a composition capable of greatly increasing the expansion ratio as compared with conventional compositions containing a thermally decomposable blowing agent and capable of improving the strength and surface property of foamed articles is obtained by adding a specific (meth)acrylic acid ester copolymer, a thermally decomposable inorganic blowing agent, a thermally decomposable organic blowing agent and optionally a filler to a vinyl chloride resin.

Thus, in accordance with the present invention, there is provided an expandable vinyl chloride resin composition comprising (1) 100 parts by weight of a vinyl chloride resin, (2) 0.5 to 30 parts by weight of, as a processing aid, a two stage (meth)acrylic acid ester polymer having a specific viscosity of not less than 0.5 measured at 30° C. with respect to a solution of 0.1 g of the polymer dissolved in 100 ml of chloroform, the two stage polymer being obtained by emulsion-polymerizing (a) 50 to 99 parts by weight of a monomer mixture comprising 50 to 100% by weight of methyl methacrylate, 0 to 50% by weight of at least one monomer selected from the group consisting of an acrylic acid ester and a methacrylic acid ester excepting methyl methacrylate and 0 to 20% by weight of other vinyl monomer copolymerizable therewith to give a polymer having a specific viscosity of not less than 0.7 measured at 30° C. with respect to a solution of 0.1 g of the polymer dissolved in 100 ml of chloroform and polymerizing, in the presence of a latex of the obtained polymer, (b) 1 to 50 parts by weight of a monomer mixture comprising 0 to 50% by weight of methyl methacrylate, 50 to 100% by weight of at least one monomer selected from the group consisting of an acrylic acid ester and a methacrylic acid ester excepting methyl methacrylate and 0 to 20% by weight of other vinyl monomer copolymerizable therewith wherein the total of the monomer mixtures (a) and (b) is 100 parts by weight, (3) 0.3 to 25 parts by weight of a thermally decomposable inorganic blowing agent and (4) 0.01 to 15 parts by weight of a thermally decomposable organic blowing agent.

Sodium bicarbonate is particularly preferred as the thermally decomposable inorganic blowing agent.

The expandable vinyl chloride resin composition of the present invention may further contain 1 to 20 parts by weight of a filler. As a filler are preferably used calcium carbonate, talc, mica, clay, wollastonite, asbestos, glass fiber and montmorillonite.

The feature of the present invention resides in that a copolymer which is obtained by emulsion polymerization of a monomer mixture containing a predominant amount of specific methacrylic acid ester and/or acrylic acid ester is used as a processing aid for vinyl chloride resins. By using such a processing aid together with both a thermally decomposable inorganic blowing agent and a thermally decomposable organic blowing agent or with them and a filler, there can be exhibited the effect that the expansion ratio in the foaming can be increased without impairing excellent physical and chemical properties that the vinyl chloride resins originally possess.

BEST MODE FOR CARRYING OUT THE INVENTION

The vinyl chloride resins used in the present invention are not particularly limited, and any of conventionally used vinyl chloride resins can be used in the present invention. Homopolymer and copolymers composed of 80 to 100% by weight of units of vinyl chloride and 0 to 20% by weight of units of other monomers copolymerizable with vinyl chloride are preferable.

Examples of the other monomer copolymerizable with vinyl chloride are, for instance, vinyl acetate, propylene, styrene, an acrylic acid ester (e.g., alkyl acrylates having a $C_1$ to $C_8$ alkyl group such as methyl acrylate, ethyl acrylate, butyl acrylate and octyl acrylate), and other vinyl monomers. These vinyl monomers may be used alone or in admixture thereof.

The average degree of polymerization of the vinyl chloride resin is not particularly limited, but vinyl chloride resins having an average degree of polymerization of about 400 to about 1,000 are usually employed.

Such vinyl chloride resins include, for instance, polyvinyl chloride, copolymers of not less than 80% by weight of units of vinyl chloride and not more than 20% by weight of units of other copolymerizable monomer such as vinyl acetate, propylene, styrene or an acrylic acid ester, a chlorinated polyvinyl chloride, and the like. These may be used alone or in admixture thereof.

The processing aid used in the present invention comprises a polymer mixture obtained by polymerizing a monomer mixture (b) in a latex of a first stage polymer obtained by emulsion polymerization of a monomer mixture (a). Usually, a composite polymer having a two layer structure is formed by such a polymerization method. The processing aid is used for the purpose of improving the expandability of the vinyl chloride resin.

The monomer mixture (a) is required to contain 50 to 100% by weight, preferably 60 to 90% by weight, more preferably 70 to 85% by weight, of methyl methacrylate. The monomer mixture (a) may contain 0 to 50% by weight of at least one monomer selected from an acrylic acid ester and a methacrylic acid ester excepting methyl methacrylate, and preferably the mixture contains such a monomer in an amount of 10 to 40% by weight, especially 15 to 30% by weight. If the proportion of methyl methacryalte in the monomer mixture (a) is less than 50% by weight, the transparency and expandability are lowered. Also, if the proportion of the monomer selected from an acrylic acid ester and a methacrylic acid ester excepting methyl methacrylate exceeds 50% by weight, the transparency and expandability are lowered. The monomer mixture (a) may further contain 0 to 20% by weight, preferably at most 10% by weight, more preferably at most 5% by weight, of other vinyl monomers copolymerizable with the (meth)acrylic acid esters.

Examples of the methacrylic acid ester excepting methyl methacrylate in the monomer mixture (a) are, for instance, alkyl methacrylates having a $C_2$ to $C_8$ alkyl group such as ethyl methacrylate, propyl methacrylate, butyl methacrylate and 2-ethylhexyl methacrylate. Examples of the acrylic acid ester are, for instance, alkyl acrylates having a $C_1$ to $C_8$ alkyl group such as methyl acrylate, ethyl acrylate, propyl acrylate, butyl acrylate and 2-ethylhexyl acrylate. These acrylates and methacrylates excepting methyl methacrylate may be used alone or in admixture thereof.

Examples of the other vinyl monomers in the monomer mixture (a) are, for instance, an aromatic vinyl compound such as styrene or α-methylstyrene, an unsaturated nitrile compound such as acrylonitrile, and the like. These may be used alone or in admixture thereof.

The homopolymer and copolymers (first stage polymer) obtained by emulsion polymerization of the monomer mixture (a) is preferred to have a high molecular weight, and the specific viscosity thereof measured at 30° C. with respect to a solution of 0.1 g of the polymer dissolved in 100 ml of chloroform is at least 0.7, preferably from 0.7 to 1.9, more preferably from 0.8 to 1.8, further preferably from 0.8 to 1.7, still further preferably from 0.9 to 1.6. If the specific viscosity is less than 0.7, the expansion ratio cannot be increased. Also, if the specific viscosity exceeds 1.9, the expandability and processability tend to lower.

In the present invention, a monomer mixture (b) is polymerized in the presence of a first stage polymer latex to provide an outer layer of a homopolymer or copolymer made of the monomer mixture (b) on the first stage polymer. By the provision of outer layer of such a second stage polymer on the first stage polymer, gelation of vinyl chloride resins can be accelerated and generation of non-gelled material can be prevented when the obtained two stage polymer is incorporated as a processing aid into the vinyl chloride resins. As a result, viscosity and elasticity can be efficiently imparted to vinyl chloride resins.

The monomer mixture (b) is required to contain 50 to 100% by weight, preferably 51 to 80% by weight, more preferably 55 to 70% by weight, of at least one monomer selected from an acrylic acid ester and a methacrylic acid ester excepting methyl methacrylate. The monomer mixture (b) may contain 0 to 50% by weight of methyl methacrylate, and preferably the monomer mixture (b) contains 20 to 49% by weight, especially 30 to 45% by weight, of methyl methacrylate. If the proportion of the monomer selected from an acrylic acid ester and a methacrylic acid ester excepting methyl methacrylate is less than 50% by weight, a good gelling property is lost and non-gelled material is easy to be produced. In addition, the expandability is also lowered.

Also, the monomer mixture (b) may contain 0 to 20% by weight, preferably at most 10% by weight, more preferably at most 5% by weight, of other vinyl monomers copolymerizable with the above-mentioned (meth)acrylic acid esters. If the content of the copolymerizable other vinyl monomers exceeds 20% by weight, the transparency and expandability are lowered.

Examples of the methacrylic acid ester excepting methyl methacrylate in the monomer mixture (b) are, for instance, alkyl methacrylates having a $C_2$ to $C_8$ alkyl group such as ethyl methacrylate, propyl methacrylate, butyl methacrylate and 2-ethylhexyl methacrylate. Examples of the acrylic acid ester are, for instance, alkyl acrylates having a $C_1$ to $C_8$ alkyl group such as methyl acrylate, ethyl acrylate, propyl acrylate, butyl acrylate and 2-ethylhexyl acrylate. These acrylates and methacrylates excepting methyl methacrylate may be used alone or in admixture thereof. Of these, butyl acrylate is preferable from the viewpoint that polymers having a low glass transition temperature are obtained.

Examples of the copolymerizable other vinyl monomers in the monomer mixture (b) are, for instance, an aromatic vinyl compound such as styrene or α-methylstyrene, an unsaturated nitrile compound such as acrylonitrile, and the like. These may be used alone or in admixture thereof.

With respect to the proportions of the monomer mixture (a) and the monomer mixture (b) used in the preparation of the processing aid of the present invention, per 100 parts by weight of the total of the monomer mixtures (a) and (b), the monomer mixture (a) is used in an amount of 50 to 99 parts by weight, preferably 60 to 95 parts by weight, more preferably 65 to 90 parts by weight, and the monomer mixture (b) is used in an amount of 1 to 50 parts by weight, preferably 5 to 40 parts by weight, more preferably 10 to 35 parts by weight.

If the amount of the monomer mixture (a), namely the first stage polymer, is less than 50 parts by weight, the gelation of vinyl chloride resins is not sufficiently improved, so sufficient expandability is not obtained. Also, if the amount of the monomer mixture (b), namely the second stage polymer, is more than 50 parts by weight, gelation property, transparency and expandability of vinyl chloride resin compositions are impaired. By the presence of a polymer formed from the monomer mixture (b) as an outer layer on the first stage polymer, the gelation property, processability and expandability are peculiarly improved and, as a result, the effect of addition of the processing aid of the present invention becomes highly efficient.

The processing aid of the present invention is prepared by the following method.

Firstly, the monomer mixture (a) is emulsion-polymerized in a suitable medium in the presence of an emulsifier, a polymerization initiator and optionally a chain transfer agent according to a known method, thereby giving a first stage polymer latex. The polymerization is conducted by emulsion polymerization method, since it is possible to make the specific viscosity high. Subsequently, the monomer mixture (b) is added to the first stage polymer latex and is polymerized. By such a stepwise polymerization of the monomer mixtures (a) and (b) is produced a two stage polymer comprising an inner layer of a polymer formed from the monomer mixture (a) and an outer layer of a polymer formed from the monomer mixture (b).

The dispersion medium used in the emulsion polymerization is usually water.

Known emulsifiers are used. Examples of the emulsifier are, for instance, an anionic surfactant such as a fatty acid salt, an alkyl sulfate, an alkylbenzene sulfonate, an alkyl phosphate or a sulfosuccinic acid diester, and a non-ionic surfactant such as a polyoxyethylene alkyl ether or a polyoxyethylene fatty acid ester.

As the polymerization initiator are used water-soluble and oil-soluble polymerization initiators. For example, usual inorganic polymerization initiators such as a persulfate, organic peroxides or azo compounds may be used alone, or may be used as a redox system in combination with a sulfite, a thiosulfate, a primary metal salt, formaldehyde sodium sulfoxylate or the like. Preferable persulfates include, for instance, sodium persulfate, potassium persulfate, ammonium persulfate, and the like. Preferable peroxides include, for instance, t-butyl hydroperoxide, cumene hydroperoxide, benzoyl peroxide, lauroyl peroxide, and the like.

The chain transfer agent is not particularly limited. For instance, t-dodecylmercaptan, n-dodecylmercaptan, t-decylmercaptan, n-decylmercaptan and the like can be used.

The temperature and time of the polymerization reaction are not particularly limited and are suitably adjusted so as to obtain the desired specific viscosity and particle size in accordance with the purpose of use.

In the second stage polymerization, the monomer mixture (b) can be added after confirming that the first stage polymerization is completed, whereby the second stage polymerization can be carried out without mixing of the second stage monomer mixture (b) with the first stage monomer mixture (a).

Preferably the polymerization of the second stage monomer mixture (b) is carried out by an emulsion polymerization method from the viewpoint that it is possible to raise the specific viscosity. The emulsifier, polymerization initiator and chain transfer agent to be used in the second stage polymerization are not particularly limited. Also, the polymerization reaction conditions such as time and temperature can be suitably adjusted according to the purpose of use.

The thus obtained two stage polymer latex has an average particle size of 100 to 3,000 Å (0.01 to 0.3 μm), preferably 100 to 2,000 Å (0.01 to 0.2 μm). The particles are taken out of the latex by salting out or coagulation by means of addition of a usual electrolyte, or spray drying in hot air. Also, as occasion demands, washing, dehydration, drying and the like are carried out in a usual manner.

The thus obtained two stage polymer useful as a processing aid has a specific viscosity of at least 0.5 measured at 30° C. with respect to a solution of 0.1 g of the polymer dissolved in 100 ml of chloroform, preferably 0.5 to 1.7, more preferably 0.6 to 1.6, the most preferably 0.7 to 1.5. If the specific viscosity is less than 0.5, the expansion ratio cannot be increased. If the specific viscosity is more than 1.7, the expandability and processability tend to lower.

In general, the processing aid is preferably a white powder having an average particle size of 30 to 300 μm from the viewpoint of incorporating it as a processing aid into a vinyl chloride resin.

The processing aid is used in an amount of 0.5 to 30 parts by weight, preferably 5 to 25 parts by weight, more preferably 8 to 25 parts by weight, per 100 parts by weight of a vinyl chloride resin. If the amount of the processing aid is less than 0.5 part by weight, the effect to be produced by the addition of the processing aid is not sufficiently obtained. If the amount is more than 30 parts by weight, excellent mechanical properties of the vinyl chloride resin are impaired.

In the present invention, combinations of a thermally decomposable inorganic blowing agent and a thermally decomposable organic blowing agent is used as a blowing agent. The term "thermally decomposable inorganic blowing agent" as used herein means an inorganic compound capable of generating, by the thermal decomposition thereof, a gas such as nitrogen gas, carbon dioxide gas, carbon monoxide gas, ammonia gas, oxygen gas, hydrogen gas or mixtures thereof in an amount effective for expansion of vinyl chloride resins. Also, the thermally decomposable organic blowing agent is non-organic-solvent type blowing agents and means an organic compound capable of generating, by the thermal decomposition thereof, an effective amount of a gas, typically a gas composed mainly of nitrogen gas, for the expansion of vinyl chloride resins.

Examples of the thermally decomposable inorganic blowing agent used in the present invention are, for instance, sodium bicarbonate, potassium bicarbonate, ammonium bicarbonate, sodium carbonate, ammonium carbonate, and the like. These may be used alone or in admixture thereof. Of these, sodium bicarbonate is preferred from the viewpoints of expansion efficiency and cost.

The amount of the thermally decomposable inorganic blowing agent is selected in accordance with the purpose without particular restriction. Usually, the amount is from 0.3 to 25 parts by weight, especially 1 to 18 parts by weight, per 100 parts by weight of a vinyl chloride resin. If the amount of the thermally decomposable inorganic blowing agent is less than 0.3 part by weight, foamed articles having a sufficient expansion ratio are hard to be obtained. If the amount is more than 25 parts by weight, foamed articles having uniform cells are hard to be obtained.

Also, the amount of the thermally decomposable inorganic blowing agent may be changed in conformity with the amount of the processing aid. For example, it is preferable to use the thermally decomposable inorganic blowing agent in an amount of, per 100 parts by weight of a vinyl chloride resin, 0.5 to 5 parts by weight when the processing aid is used in an amount of 5 parts by weight, 1.0 to 8 parts by weight when the processing aid is used in an amount of 10 parts by weight, and 1.5 to 18 parts by weight when the processing aid is used in an amount of 20 parts by weight.

Examples of the thermally decomposable organic blowing agent used in the present invention are, for instance, a nitroso compound such as N,N'-dinitrosopentamethylenetetramine or N,N'-dimethylN,N'-dinitrosoterephthalamide, an azo compound such as azodicarbonamide or azobisisobutyronitrile, a sulfonyl hydrazide compound such as benzenesulfonyl hydrazide or toluenesulfonyl hydrazide, and the like. These may be used alone or in admixture thereof. Of these, azodicarbonamide is preferred from the viewpoints of expansion efficiency and cost.

The amount of the thermally decomposable organic blowing agent is from 0.01 to 15 parts by weight, preferably 0.1 to 5 parts by weight, per 100 parts by weight of a vinyl chloride resin. If the amount of the thermally decomposable organic blowing agent is less than 0.01 part by weight, the effect of improving the surface property and strength of foamed articles is not obtained. If the amount is more than 15 parts by weight, the expansion ratio tends to rather lower.

Also, the amount of the thermally decomposable organic blowing agent may be changed in conformity with the amount of the thermally decomposable inorganic blowing agent. For example, it is preferable to use the thermally decomposable organic blowing agent in an amount of, per 100 parts by weight of a vinyl chloride resin, 0.1 to 0.6 part by weight when the inorganic blowing agent is used in an amount of 2 parts by weight, 0.5 to 1.5 parts by weight when the inorganic blowing agent is used in an amount of 5 parts by weight, and 1.0 to 3 parts by weight when the inorganic blowing agent is used in an amount of 10 parts by weight. In general, the inorganic blowing agent/organic blowing agent ratio is from 1:0.05 to 1:0.3 by weight, especially 1:0.1 to 1:0.3 by weight.

It is desirable to further incorporate a filler into the expandable vinyl chloride resin composition of the present invention in order to improve the strength of molded articles.

Examples of the filler used in the present invention are, for instance, calcium carbonate, talc, mica, clay, wollastonite, asbestos, glass fiber, montmorillonite, and the like. These may be used alone or in admixture thereof. Calcium carbonate, talc, mica, wollastonite, glass fiber and montmorillonite are preferred from the viewpoint of improvement in strength.

The amount of the filler is from 1 to 20 parts by weight, preferably 3 to 18 parts by weight, more preferably 5 to 15 parts by weight, per 100 parts by weight of a vinyl chloride resin. If the amount of the filler is less than 1 part by weight, the effect of making the cells of foamed articles uniform is small. If the amount is more than 20 parts by weight, the melt viscosity tends to rise and also the expandability tends to lower.

The expandable vinyl chloride resin composition of the present invention may contain one or more of other additives such as stabilizer, lubricant, impact modifier, plasticizer, colorant and the like, as occasion demands.

The process for preparing the expandable vinyl chloride resin composition of the present invention is not particularly limited. For example, the composition can be prepared in such a manner as mixing a vinyl chloride resin, the processing aid, a thermally decomposable inorganic blowing agent, a thermally decomposable organic blowing agent, and optionally a filler and other additives, and melt-kneading the mixture at an appropriate temperature by a melt kneader such as a single screw extruder or a twin screw extruder.

The method of the molding processing of the expandable vinyl chloride resin composition of the present invention is not particularly limited, and generally used molding methods such as extrusion are applicable.

The present invention is more specifically explained by means of examples and comparative examples, in which all parts and % are by weight unless otherwise noted. It is to be understood that the present invention is not limited to these examples.

Methods of evaluation used in the examples and comparative examples are shown below.

(Measurement of Specific Viscosity of Polymer)

In 100 ml of chloroform was dissolved 0.1 g of a polymer sample, and the measurement was carried out using a Ubbelohde's viscometer kept at a constant temperature in a water bath of 30° C.

(Measurement of Expansion Ratio)

After measuring the specific gravity of a obtained powder compound (non-foamed molding of vinyl chloride resin composition), the compound was molded by a molding machine Model CMT-45 made by Cincinnati Milacron Inc. to give a plate-like molded article (foamed molding of vinyl chloride resin composition), and the specific gravity of the plate-like molded article was measured. The expansion ratio was calculated from the measured values according to the following equation.

Expansion ratio=(specific gravity of non-foamed molding)/(specific gravity of foamed molding)

The molding conditions are shown below.
Molding conditions
Molding temperature:
    C1=150° C., C2=160° C., C3=170° C.
    Adapter=175° C., Die=180° C.
Revolutions of screw: 10 r.p.m.
Output: 15 kg/hour
Die: 1 mm×170 mm (Measurement of Polymerization Conversion)

The polymerization conversion was calculated according to the following equation.

Polymerization conversion (%)=(amount of produced polymer/amount of monomers charged)×100

(Measurement of Average Particle Size of Latex)

With respect to a latex obtained, the average particle size was measured using light scattering in a wavelength of 546 nm by a Spectrophotometer U-2000 made by Hitachi, Ltd.

(Evaluation of Surface Property)

With respect to the surface property of a foamed article obtained, the appearance was visually observed and evaluated according to the following criteria.

- A: Unevenness of the surface is scarcely observed and the appearance is excellent.
- B: Unevenness of the surface is observed but is not so noticeable.
- C: The surface is uneven and the appearance is somewhat bad.
- D: Unevenness of the surface is marked and the appearance is bad.

(Measurement of Compressive Strength)

Compressive strength at 20% compression was measured at 23° C. according to JIS K 7220.

(Measurement of Flexural Strength)

Flexural strength was measured at 23° C. according to JIS K 7221.

(Measurement of Heat Distortion Temperature)

Heat distortion temperature (HDT) was measured under a condition of bending stress 18.5 kgf/cm$^2$ according to JIS K 7207.

EXAMPLE 1

An 8 liter reactor equipped with a stirrer was charged with 0.7 part of sodium dioctylsuccinate dissolved in water as an emulsifier, and thereto was added water so that the total amount of water including water included in sub-raw materials added later became 200 parts. After passing a nitrogen gas through the gaseous phase and liquid phase of the reactor to expel oxygen from the space and water, the temperature of the content was elevated to 70° C. with stirring. To the reactor was then added at a time a first stage monomer mixture composed of 68 parts of methyl methacrylate (hereinafter also referred to as "MMA") and 12 parts of butyl acrylate (hereinafter also referred to as "BA"). Subsequently 0.01 part of potassium persulfate was added as an initiator, and stirring was continued for 1 hour to substantially complete the polymerization. A second stage monomer mixture composed of 6 parts of MMA and 14 parts of BA was added dropwise at a rate of about 30 parts per hour. After the completion of the dropwise addition, the content in the reactor was kept at 70° C. for 90 minutes and was then cooled to give a latex. The average particle size of the latex was measured. The result is shown in Table 1.

The polymerization conversion was 99.6%. The latex was coagulated by salting out with an aqueous solution of calcium chloride, heat-treated by elevating the temperature to 90° C. and dehydrated by a centrifugal dehydrator. The obtained cake of a resin was washed with an approximately same amount of water as the weight of the resin and was dried at 50° C. for 15 hours by a parallel flow dryer to give a white powder of polymer sample (1). The specific viscosity of the obtained polymer sample (1) was measured. The result is shown in Table 1.

In a Henschel mixer, 100 parts of a polyvinyl chloride (KANEVINYL S-1007 made by Kaneka Corporation, average degree of polymerization 680) was mixed with 20.0 parts of the above polymer sample (1), 6.0 parts of calcium carbonate, 2.0 parts of titanium oxide, 2.0 parts of an octyl tin mercapto-type stabilizer (TVS #8831 made by Nitto Kasei Kabushiki Kaisha), 0.6 part of calcium stearate, 0.1 part of hydroxystearic acid (LOXIOL G-21 made by Henkel GmbH), 0.9 part of a dibasic fatty acid alcohol ester (LOXIOL G-60 made by Henkel GmbH) and 0.6 part of a polyethylene wax (ACPE-629A made by Allied Chemical Corporation), and the inner temperature was elevated to 110° C. After cooling, 5.4 parts of sodium bicarbonate and 0.6 part of azodicarbonamide were incorporated into the mixture to give a powder compound. The compound was molded by CMT-45 made by Cincinnati Milacron Inc. to give a foamed article. With respect to the obtained foamed article, the surface property was evaluated and the expansion ratio, compressive strength, flexural strength and HDT were measured. The results are shown in Table 1.

EXAMPLES 2 TO 4 AND COMPARATIVE EXAMPLE 1

Polymer samples (2) to (5) were prepared according to the recipe shown in Table 1 in the same manner as in Example 1, and the characteristics thereof were measured. Also, foamed articles were obtained by incorporating each of the obtained polymer samples (2) to (5) into polyvinyl chloride in the same manner as in Example 1, and were evaluated. The results are shown in Table 1.

TABLE 1

|  |  | Ex. 1 | Ex. 2 | Ex. 3 | Ex. 4 | Com. Ex. 1 |
|---|---|---|---|---|---|---|
| Polymer sample No. |  | (1) | (2) | (3) | (4) | (5) |
| Composition (part) |  |  |  |  |  |  |
| Polymer sample |  |  |  |  |  |  |
| 1st stage mixture | MMA | 68 | 68 | 68 | 68 | 68 |
|  | BA | 12 | 12 | 12 | 12 | 12 |
| 2nd stage mixture | MMA | 6 | 6 | 6 | 6 | 6 |
|  | BA | 14 | 14 | 14 | 14 | 14 |
| Initiator |  | 0.01 | 0.007 | 0.003 | 0.001 | 0.1 |
| Emulsifier |  | 0.7 | 0.7 | 0.7 | 0.7 | 0.5 |

TABLE 1-continued

|  | Ex. 1 | Ex. 2 | Ex. 3 | Ex. 4 | Com. Ex. 1 |
|---|---|---|---|---|---|
| Results of evaluation |  |  |  |  |  |
| Polymerization conversion (%) | 99.5 | 99.7 | 99.5 | 99.4 | 99.4 |
| Specific viscosity of polymer sample | 0.73 | 0.82 | 0.92 | 1.06 | 0.33 |
| Average particle size of latex (Å) | 1500 | 1600 | 1600 | 1600 | 1600 |
| Expansion ratio (times) | 6.5 | 6.7 | 7.1 | 9.1 | 2.6 |
| Surface property | A | A | A | A | C |
| Compressive strength (kgf/cm$^2$) | 27 | 26 | 26 | 24 | 35 |
| Flexural strength (kgf/cm$^2$) | 75 | 74 | 74 | 72 | 130 |
| HDT (° C.) | 49 | 49 | 49 | 47 | 58 |

From the results shown in Table 1, it is understood that compositions having a good expandability are obtained when polymer samples (1) to (4) having a specific viscosity of not less than 0.5, but no sufficient expandability is obtained when polymer sample (5) having a specific viscosity of less than 0.5, and accordingly the specific viscosity of the polymer is required to be not less than 0.5 for obtaining the effects of the present invention.

EXAMPLES 5 TO 7 AND COMPARATIVE EXAMPLES 2 AND 3

Foamed articles were prepared in the same manner as in Example 3 except that the amount of polymer sample (3) was changed as shown in Table 2 instead of 20.0 parts per 100 parts of polyvinyl chloride in order to evaluate a change in expandability when the amount of polymer sample (3) incorporated into polyvinyl chloride was changed. The expandability, surface property, compressive strength, flexural strength and HDT of the foamed articles were evaluated. The results are shown in Table 2, provided that in Comparative Example 3 a foamed article suitable to evaluate the expandability could not be obtained due to non-uniformity of a composition obtained.

TABLE 2

|  | Ex. 5 | Ex. 6 | Ex. 7 | Com. Ex. 2 | Com. Ex. 3 |
|---|---|---|---|---|---|
| Polymer sample No. | (3) | (3) | (3) | (3) | (3) |
| Amount (part) | 10 | 15 | 25 | 0.3 | 40 |
| Results of evaluation |  |  |  |  |  |
| Expansion ratio (times) | 6.1 | 6.6 | 9.2 | 1.3 | — |
| Surface property | A | A | A | D | D |
| Compressive strength (kgf/cm$^2$) | 27 | 27 | 24 | — | — |
| Flexural strength (kgf/cm$^2$) | 74 | 74 | 72 | — | — |
| HDT (° C.) | 50 | 50 | 48 | — | — |

From the results shown in Table 2, it is understood that the compositions incorporated with the processing aid according to the present invention exhibit a good expandability, but sufficient expandability is not obtained if the amount of the processing aid is small as shown in Comparative Example 2.

EXAMPLES 8 TO 12 AND COMPARATIVE EXAMPLES 4 TO 10

Foamed articles were prepared in the same manner as in Example 3 except that the kind and amount of the thermally decomposable blowing agent were changed as shown in Tables 3 and 4. The expandability, surface property, compressive strength, flexural strength and HDT of the foamed articles were evaluated. The results are shown in Tables 3 and 4.

In the tables, SBC denotes sodium bicarbonate, and ADCA denotes azodicarbonamide.

TABLE 3

|  | Example No. |  |  |  |  |  |  |
|---|---|---|---|---|---|---|---|
|  | 8 | 9 | 10 | 5 | 3 | 11 | 12 |
| Polymer sample |  |  |  |  |  |  |  |
| Sample number | (3) | (3) | (3) | (3) | (3) | (3) | (3) |
| Amount (part) | 5 | 5 | 10 | 10 | 20 | 20 | 20 |
| Amount of SBC (part) | 1.3 | 2.7 | 1.8 | 5.4 | 5.4 | 2.7 | 18 |
| Amount of ADCA (part) | 0.2 | 0.3 | 0.2 | 0.6 | 0.6 | 0.3 | 2 |
| Results of evaluation |  |  |  |  |  |  |  |
| Expansion ratio (times) | 5.8 | 6.0 | 5.7 | 6.1 | 7.1 | 6.2 | 5.8 |
| Surface property | A | A | A | A | A | A | A |
| Compressive strength (kgf/cm$^2$) | 26 | 26 | 28 | 27 | 26 | 27 | 27 |
| Flexural strength (kgf/cm$^2$) | 74 | 73 | 74 | 74 | 74 | 74 | 75 |
| HDT (° C.) | 49 | 48 | 49 | 50 | 49 | 49 | 50 |

TABLE 4

|  | Example No. |  |  |  |  |  |  |
|---|---|---|---|---|---|---|---|
|  | Com. Ex. 4 | Com. Ex. 5 | Com. Ex. 6 | Com. Ex. 7 | Com. Ex. 8 | Com. Ex. 9 | Com. Ex. 10 |
| Polymer sample |  |  |  |  |  |  |  |
| Sample number | (3) | (3) | (3) | (3) | (3) | (3) | (3) |
| Amount (part) | 20 | 20 | 20 | 20 | 10 | 20 | 20 |
| Amount of SBC (part) | 0.1 | 0.2 | 27 | 6 | 0 | 0 | 0 |

TABLE 4-continued

| | Com. Ex. 4 | Com. Ex. 5 | Com. Ex. 6 | Com. Ex. 7 | Com. Ex. 8 | Com. Ex. 9 | Com. Ex. 10 |
|---|---|---|---|---|---|---|---|
| Amount of ADCA (part) | 0.005 | 0 | 1 | 0 | 1 | 2 | 6 |
| Results of evaluation | | | | | | | |
| Expansion ratio (times) | 2.5 | 3.0 | 2.8 | 6.4 | 2.6 | 3.2 | 1.8 |
| Surface property | B | B | D | C | C | C | D |
| Compressive strength (kgf/cm$^2$) | 36 | 32 | — | 15 | 37 | 36 | — |
| Flexural strength (kgf/cm$^2$) | 136 | 129 | — | 56 | 135 | 134 | — |
| HDT (° C.) | 57 | 55 | — | 40 | 56 | 57 | — |

From the results shown in Tables 3 and 4, it is understood that the compositions incorporated with both a thermally decomposable inorganic blowing agent and a thermally decomposable organic blowing agent according to the present invention exhibit a good expandability, but as shown in Comparative Examples 4 and 5, a sufficient expansion ratio is not obtained if the amount of the blowing agents is small. A sufficient expandability was not obtained also in the case that the amount of the blowing agents is too large as shown in Comparative Example 6, and it was impossible to make the evaluation of compressive strength, flexural strength and HDT. It is also understood that as shown in Comparative Example 7, a good expandability is obtained even if a thermally decomposable inorganic blowing agent is used alone, but the surface property, compressive strength, flexural strength and HDT are not excellent. That is to say, it would be understood that combination use of a thermally decomposable inorganic blowing agent and a thermally decomposable organic blowing agent is necessary for obtaining foamed articles having a high expansion ratio and excellent surface property, compressive strength, flexural strength and HDT. Further, it is understood that a sufficient expandability is not obtained when a thermally decomposable organic blowing agent is used alone, as shown in Comparative Examples 8 and 9.

EXAMPLES 13 TO 20 AND COMPARATIVE EXAMPLES 11 TO 13

Foamed articles were prepared in the same manner as in Example 3 except that the kind and amount of the filler were changed as shown in Tables 5 and 6. The expandability, surface property, compressive strength, flexural strength and HDT of the foamed articles were evaluated. The results are shown in Tables 5 and 6.

The fillers shown in the tables are commercial products as shown below.

Talc: LMS-200 made by Fuji Talc Kabushiki Kaisha
Mica: A-21 made by Yamaguchi Ummo Kabushiki Kaisha
Montmorillonite: CLOISITE-25A made by Southern Clay Corp.

TABLE 5

| | | Example No. | | | | | | | |
|---|---|---|---|---|---|---|---|---|---|
| | | 3 | 13 | 14 | 15 | 16 | 17 | 18 | 19 | 20 |
| Filler | Kind | calcium carbonate | calcium carbonate | talc | talc | talc | mica | mica | montmo-rillonite | montmo-rillonite |
| | Amount (part) | 6 | 10 | 6 | 10 | 15 | 6 | 10 | 6 | 6 |
| Results of evaluation | | | | | | | | | | |
| Expansion ratio (times) | | 7.1 | 6.8 | 7.0 | 6.8 | 5.8 | 6.9 | 6.3 | 6.9 | 6.3 |
| Surface property | | A | A | A | A | A | A | A | A | A |
| Compressive strength (kgf/cm$^2$) | | 26 | 29 | 28 | 31 | 34 | 26 | 31 | 33 | 26 |
| Flexural strength (kgf/cm$^2$) | | 74 | 77 | 77 | 80 | 82 | 75 | 81 | 89 | 75 |
| HDT (° C.) | | 49 | 52 | 51 | 55 | 57 | 49 | 55 | 55 | 49 |

TABLE 6

| | | Com. Ex. 11 | Com. Ex. 12 | Com. Ex. 13 |
|---|---|---|---|---|
| Filler | Kind | calcium carbonate | talc | calcium carbonate |
| | Amount (part) | 0.3 | 30 | 60 |
| Results of evaluation | | | | |
| Expansion ratio (times) | | — | 3.8 | — |
| Surface property | | D | C | D |
| Compressive strength (kgf/cm$^2$) | | — | 38 | — |
| Flexural strength (kgf/cm$^2$) | | — | 88 | — |
| HDT (° C.) | | — | 57 | — |

As shown in Comparative Examples 12 and 13, molded articles suitable for the evaluation were not obtained due to marked breaking of cells when the amount of a filler was too large.

INDUSTRIAL APPLICABILITY

The expandable vinyl chloride resin composition of the present invention provides foamed articles having an expansion ratio as high as about 5–10 in spite of the use of thermally decomposable blowing agents, while suppressing deterioration of surface property and strength which would result from increase in expansion ratio. Therefore, cost reduction is possible since an existing extruder can be used, and also the range of uses is expanded.

What is claimed is:

1. An expandable vinyl chloride resin composition comprising (1) 100 parts by weight of a vinyl chloride resin, (2) 0.5 to 30 parts by weight of, as a processing aid, a two stage (meth)acrylic acid ester polymer having a specific viscosity of not less than 0.5 measured at 30° C. with respect to a solution of 0.1 g of the polymer dissolved in 100 ml of chloroform, the two stage polymer being obtained by emulsion-polymerizing (a) 50 to 99 parts by weight of a monomer mixture comprising 50 to 100% by weight of methyl methacrylate, 0 to 50% by weight of at least one monomer selected from the group consisting of an acrylic acid ester and a methacrylic acid ester excepting methyl methacrylate and 0 to 20% by weight of other vinyl monomer copolymerizable therewith to give a polymer having a specific viscosity of not less than 0.7 measured at 30° C. with respect to a solution of 0.1 g of the polymer dissolved in 100 ml of chloroform and polymerizing, in the presence of a latex of the obtained polymer, (b) 1 to 50 parts by weight of a monomer mixture comprising 0 to 49% by weight of methyl methacrylate, 51 to 100% by weight of at least one monomer selected from the group consisting of an acrylic acid ester and a methacrylic acid ester excepting methyl methacrylate and 0 to 20% by weight of other vinyl monomer copolymerizable therewith wherein the total of the monomer mixtures (a) and (b) is 100 parts by weight, (3) 0.3 to 25 parts by weight of a thermally decomposable inorganic blowing agent and (4) 0.01 to 15 parts by weight of a thermally decomposable organic blowing agent.

2. The composition of claim 1, wherein said thermally decomposable inorganic blowing agent is sodium bicarbonate.

3. The composition of claim 1 which further contains 1 to 20 parts by weight of a filler per 100 parts by weight of said vinyl chloride resin.

4. The composition of claim 3, wherein said filler is at least one member selected from the group consisting of calcium carbonate, talc, mica, clay, wollastonite, asbestos, glass fiber and montmorillonite.

* * * * *